(12) United States Patent
McCormack et al.

(10) Patent No.: US 7,796,747 B1
(45) Date of Patent: Sep. 14, 2010

(54) METHOD AND SYSTEM FOR MANAGEMENT OF QUEUES IN CONTACT CENTERS

(75) Inventors: Tony McCormack, Galway (IE); Patrick Hession, Galway (IE); John Costello, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 1162 days.

(21) Appl. No.: 11/431,230

(22) Filed: May 10, 2006

(51) Int. Cl.
*H04M 3/00* (2006.01)

(52) U.S. Cl. ............... 379/265.12; 379/203.01; 709/204

(58) Field of Classification Search ........... 379/265.12, 379/203.01, 93.21; 709/204, 227
See application file for complete search history.

(56) References Cited

U.S. PATENT DOCUMENTS

| | | | |
|---|---|---|---|
| 7,570,606 B2 * | 8/2009 | McCormack et al. | 370/260 |
| 7,606,909 B1 * | 10/2009 | Ely et al. | 709/227 |
| 2006/0062376 A1 * | 3/2006 | Pickford | 379/265.12 |
| 2006/0239420 A1 * | 10/2006 | Hollatz et al. | 379/88.13 |
| 2006/0291637 A1 * | 12/2006 | Erickson | 379/202.01 |

* cited by examiner

*Primary Examiner*—Creighton Smith
(74) *Attorney, Agent, or Firm*—Christopher & Weisberg, P.A.

(57) ABSTRACT

Contacts are managed within a contact center by associating each contact with one or more skill set and priority identifiers. The contacts may be represented as a software object. Contact (or contact objects) may be queued relative to one another by means of references to and/or from the object(s) immediately ahead of and behind each contact. For those contacts having multiple skill sets, a process and a system is disclosed wherein the multiple skill sets of the contact are serviced by multiple agents to provide a 1 to N process. The customer may be given the option to have each additional agent conference into a contact session thereby reducing the customer's overall wait time for the contact to be serviced. The process and system also may include identifying contact objects having prerequisites and routing those contact objects to an agent having one of the prerequisites. The process and system also allows a group of related contacts to be serviced by one or more agents in an M to 1 or M to N fashion. This is accomplished in part by determining if the contact has a common identifier associating the contact with a larger group and routing the contact to an agent or agents supporting contacts having the common identifier.

25 Claims, 4 Drawing Sheets

METHOD AND SYSTEM FOR MANAGEMENT OF QUEUES IN CONTACT CENTERS

CROSS-REFERENCE TO RELATED APPLICATIONS n/a.

STATEMENT REGARDING FEDERALLY SPONSORED RESEARCH OR DEVELOPMENT n/a

BACKGROUND OF THE INVENTION

1. Statement of the Technical Field

This invention generally relates to methods and apparatuses for managing contacts at contact centers and, more specifically, to improving the processing of incoming contacts to the most suitable agent or agents.

2. Description of the Related Art

Contact centers are widely used to allow an enterprise or business to efficiently handle customer enquiries, complaints and support, and to allow an enterprise to make contact with existing or potential customers.

Contact centers receive contacts in many forms, such as telephone calls, chat session requests, emails, video calls, short messaging service (SMS) messages and any other such communications between a remote user and an agent. While the term "call center" is used interchangeably with "contact center" herein, it is to be understood that this is not a limitation on the type of contact center to which the invention applies. Such contacts must be processed and this usually means that they are assigned to agents based on the skill sets needed to effectively deal with the contacts. Because agents deal with many contacts throughout the day and the load on the center varies over time, it is necessary to maintain queues both of contacts which are waiting to be assigned and of agents who are ready for the next suitable contact. This problem becomes more complex when a contact requires the services of multiple agents or when multiple related contacts require the services of one or more agents.

A typical contact center will have two main components, namely a network interface such as a switch or a private branch exchange (PBX) which handles the calls themselves, and a management component such as a contact center server for controlling the operation of the PBX to direct calls to suitable agents. Thus, based on information gleaned from the call in its initial stages, e.g., from menu choices made in an interactive voice response (IVR) session, the contact center server (or contact manager) will determine a skill set which an agent would ideally require to handle the call. An agent is identified from those currently active at the center, taking into account the skills required to handle the call and other relevant data available to the contact center server, and the PBX is directed to transfer the call to that agent by the contact center server when the agent becomes free.

Nortel Networks provides a contact center solution in which its Meridian PBX is associated with a Symposium Call Center Server (SCCS) (Nortel, Meridian, Symposium and SCCS are trademarks). Of note, Symposium Call Center Server has been recently renamed the Nortel Contact Center. The possibility currently exists to network a number of contact centers by providing an Internet or other WAN link between the respective SCCS units of different contact centers, and by providing telephony links such as dedicated ISDN (integrated services digital network) lines or links over the public switched telephone network (PSTN) between the respective Meridian PBX units. A Networked Call Center (NCC) server may be provided on the WAN to propagate to each SCCS the network address and routing tables for all of the other networked call centers.

In conventional contact centers, contacts, regardless of whether they need the skill sets associated with multiple agents and regardless of whether there are multiple related contacts that can be serviced as a unit, are first routed through a workflow designed to determine the priority of the contact and the skill set(s) required to deal with the contact (indeed the skill set may determine the priority rating assigned to a contact). In the case of voice calls, the call will then be typically held at a private branch exchange (PBX) or a call server, and an identifier for that call will then be passed, along with the results of the workflow routing, to a contact queuing module (or "queue manager" which is part of the contact manager).

The queue manager maintains one or more queues or lists of contact identifiers, and new contacts are inserted into the appropriate queue based on skill set determinations from the workflow, and at the point in the queue determined by the priority assigned to the contact by the workflow process. However, current systems also do not address queuing and prioritization in the case where a contact requires multiple skill sets which may be associated with one or multiple agents.

Even when general queuing issues are addressed, another problem occurs when multiple skill sets are required to service a contact, but there is an insufficient supply of agents who possess all of the skills needed to handle the contact, and it is not desirable to handle each skill set separately or via callback. Similarly, the queuing problem is further complicated when a group of related contacts requires the skill set associated with one or more agents. The contacts may be related, one example being multiple students attempting to establish a team-based session with an instructor, where it is desirable that individual teams are queued to the instructor. Therefore, a need exists for an improved contact center queue management system and method that addresses and solves the aforementioned problems.

SUMMARY OF THE INVENTION

The present invention advantageously provides a method and system that manages contacts of a contact center or network of contact centers. In other words the present invention provides a "virtual contact center" which may physically have a network of contact centers. The virtual contact center of the present invention provides an arrangement that allows a contact to be efficiently queued and served by one or more agents supporting multiple skill sets and/or allows multiple related contacts to be served by one or more agents supporting one or more skill sets.

According to an aspect of the present invention, a method for managing contacts in a contact center is provided. The method includes receiving a contact requiring a priority and more than one skill set identifier, whereby the contact can be prioritized relative to other contacts, determining if the contact can be serviced by multiple agents, and if so, then routing the contact to a first agent of the multiple agents having at least one of the plurality of skill set identifiers and commencing a contact session, identifying another agent of the multiple agents having another of the plurality of skill set identifiers, and determining if the another agent of the multiple agents should be conferenced into the contact session. Upon indication that conferencing is acceptable, another agent of the multiple agents may be conferenced into the contact session. This process can continue until all of the skills necessary to handle the contact session are associated with the contact session.

According to another aspect of the present invention, a system for managing contacts in a contact center is provided. The system includes a network interface for receiving a contact, and a contact manager, where the contact manager assigns a plurality of skill set identifiers to the contact, determines if the contact can be serviced by multiple agents, routes the contact to a first agent of the multiple agents having at least one of the plurality of skill set identifiers to commence a contact session, identifies another agent of the multiple agents having another of the plurality of skill set identifiers, and determines if the another agent of the multiple agents should be conferenced into the contact session. This process can continue until all of the skills necessary to handle the contact session are associated with the contact session.

According to yet another aspect, the present invention provides a storage medium storing a computer program which when executed by a processing unit performs a method for managing contacts in a contact center. The method performed by the computer program includes managing contacts in a contact center by receiving a contact requiring a priority and more than one skill set identifier, whereby the contact can be prioritized relative to other contacts, determining if the contact can be serviced by multiple agents, and if so, then routing the contact to a first agent of the multiple agents having at least one of the more than one skill set identifiers and commencing a contact session, identifying another agent of the multiple agents having another of the more than one skill set identifiers, and determining if the another agent of the multiple agents should be conferenced into the contact session. This process can continue until all of the skills necessary to handle the contact session are associated with the contact session.

According to still yet another aspect, the present invention provides a method for managing contacts such as in a contact center. The method includes receiving a contact requiring a priority and more than one skill set identifier, whereby the contact can be prioritized relative to other contacts, determining if the contact has any skill set identifier which requires a prerequisite, routing the contact to an agent having the prerequisite, maintaining a highest priority for another agent having the skill set identifier requiring the prerequisite, and routing the contact to another agent having the skill set identifier requiring the prerequisite.

According to still another aspect, the present invention provides a method for managing contacts, such as in a contact center. A contact is received. A determination is made as to whether the contact has a common identifier associating the contact with a larger group. The common identifier is queued rather than the contact identifier and when an agent is available, the contact associated with the common identifier is routed to the agent. Additional contacts having the common identifier are identified. The additional contacts having the common identifier are routed to the agent. A group contact session is commenced.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE PREFERRED EMBODIMENTS

Figure 1:
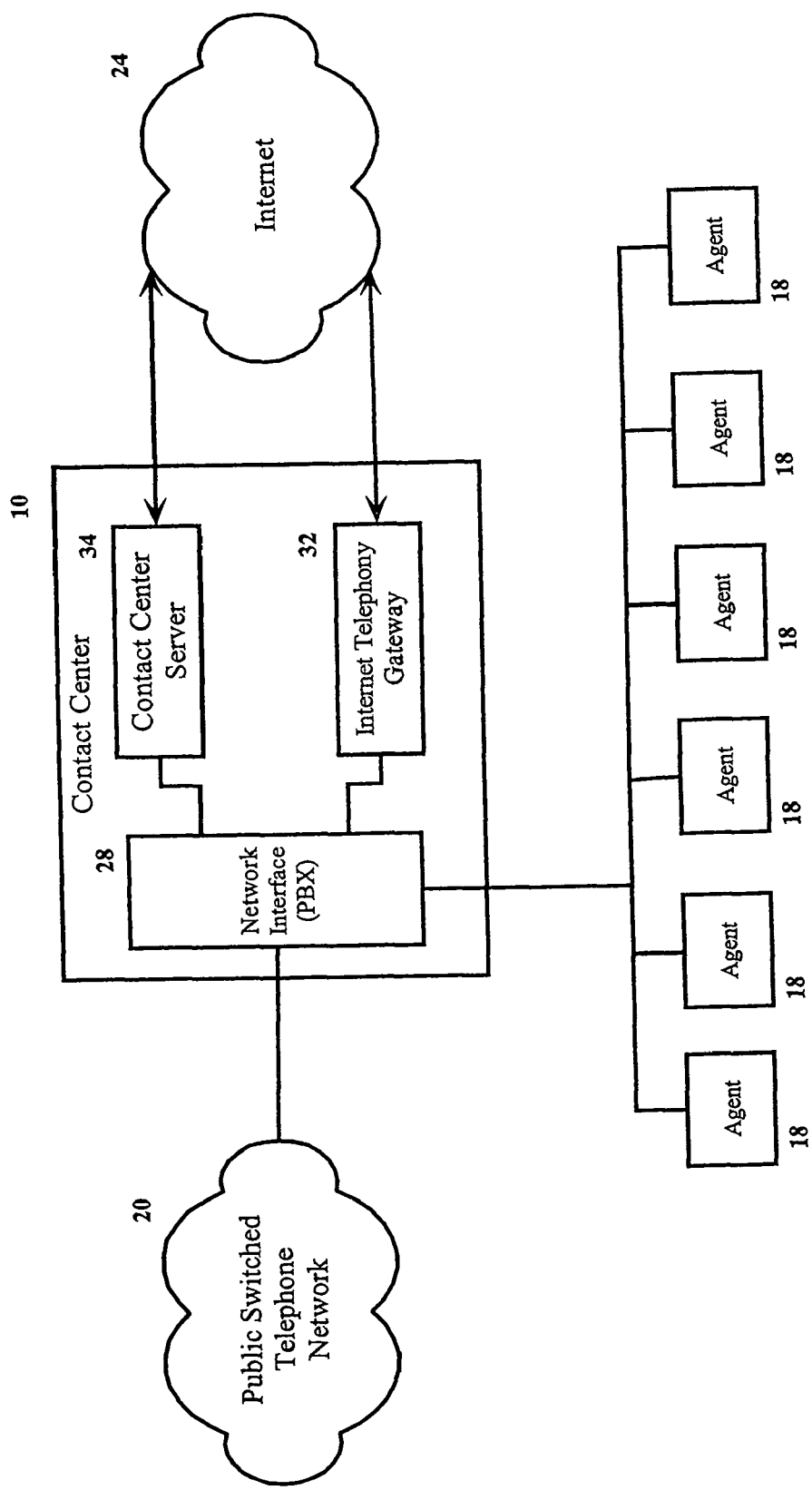
FIG. 1 is diagram of an exemplary architecture of a contact center constructed in accordance with the principles of the present invention.

Referring now to the drawing figures in which like reference designators refer to like elements, there is shown in FIG. 1, a system constructed in accordance with the principles of the present invention and designated generally as "10". Of note, FIG. 1 shows the main components or processes of a contact center 10 as they relate to the present invention. It is contemplated that such additional conventional details of a contact center 10 as may be required for a complete architecture are known to one of skill in the art. The operation of the contact center 10 is illustrated with reference to inbound voice calls but the same method of operation can be used for any other type of contacts such as outbound calls, emails, chat session requests, video calls, short messaging service (SMS) messages and any other such communications between a remote user and an agent 18.

Incoming contacts are received at a network interface 28, which in the case of voice calls may be a private branch exchange (PBX) such as the Meridian series of PBXs available from Nortel Networks ("Meridian" is a Trade Mark of Nortel Networks). The PBX is connected to and receives calls both from the public switched telephone network (PSTN) and from data networks such as the Internet and corporate intranets and wide area networks (via a suitable gateway 32, for example an Internet Telephony Gateway (ITG) or data gateway). The PBX may be a soft-switch, in which all contacts are received via the internet.

The management component 34 (or contact manager) of the contact center 10 is designed to manage a local queue of contacts (or software objects representing contacts). The contact manager, show here as Contact Center Server 34, may be comprised of various elements or modules such as multimedia routers, workflow processors, shared memory, query handlers, multimedia queue managers, agent managers and the like. These contact management elements can run on the same computer or on different computers, and it will be appreciated that the details of the implementation are not critical to the principles of operation of the system. These components (as well as those described below in functional terms) could equally be embodied in dedicated hardware in which the program instructions are hardwired in an electronic circuit.

The contact manager 34 may first direct the call to an interactive voice response (IVR) server which directs the caller to respond to a series of prompts arranged in a suitable menu structure which the caller typically navigates using tones generated by the numbers on a handset (or via speech recognition or other means known in the art). When the call is transferred to the IVR server, a workflow process manager can locate the contact or contact object in a memory area corresponding to the call (identifiable by the details of the contact held in the object) and updates the contact or contact object in accordance with the output of the IVR process. The contact manage 34 will determine a skill set which an agent 18 would ideally require to handle the contact. The contact manager 34 can then identify an agent 18 from those currently active at the contact center, taking into account the skills of that agent 18 and other relevant data available to the contact manager 34, and the PBX 28 is directed to transfer the call to that agent 18 by the contact manager 34 when the agent 18 becomes free. Alternatively, when an agent becomes free, the Contact Manager 34 selects the most suitable contact for that agent based on a match between skills of the contact and that of the agent.

A contact (or contact object) may have more than one skill set identifier (e.g. "sales", "new customer", "languages" and "product ID no. 12345"), and it is normally placed in the queues for each skill set. It may be difficult to provide a single agent 18 which has all the required skill sets, especially as the number of skill sets increases, and the related availability of such an agent 18, depicted in FIG. 2, step 706 as a "gold agent", may result in substantial wait delays for the servicing of a customer's contact. In order to reduce the wait time for a customer, the customer having the contact with multiple skill sets may be presented with the option of having its contact serviced by multiple agents. This represents a one to N (1 to N) service scheme where a single customer's contact object having multiple skill sets may be serviced by numerous agents having at least one of the various identified skill sets.

The contact center 10 can operate independently of other contact centers or it can form part of a larger networked contact center (via the Internet 24, for example). A network queue manager may be provided to control the assignment of contacts to agents across the various contact centers to be networked together.

Figure 2:
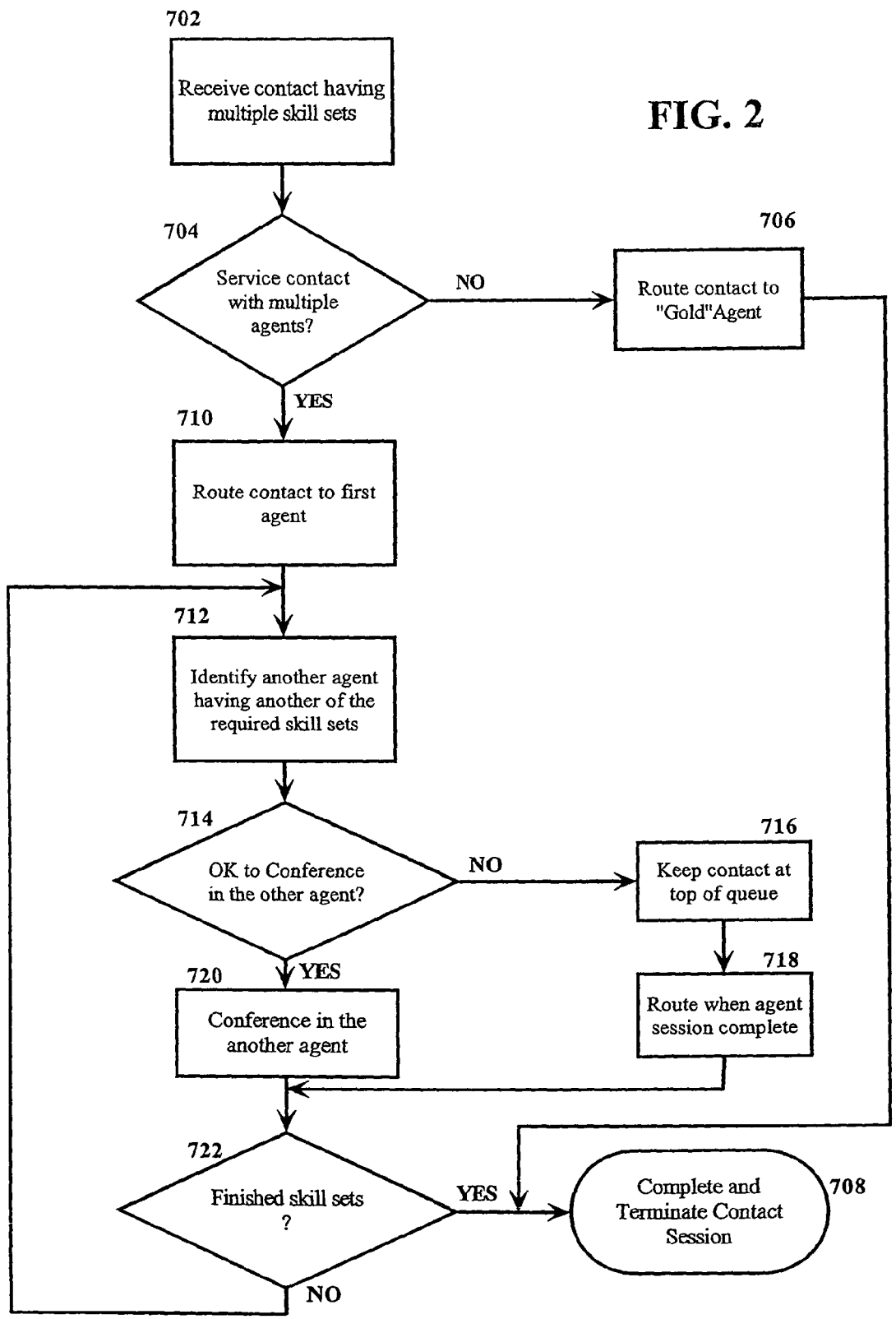
FIG. 2 is a flowchart of the process of managing a contact with multiple skill sets.

FIG. 2 is a flowchart of the process of managing a contact requiring multiple skill sets. As shown in FIG. 2, a contact (or contact object) having multiple skill sets may be provided at step 702. A customer associated with the contact object with multiple skill sets is presented with the option to have this contact serviced by multiple agents, step 704. It is also contemplated that someone or something other than the customer can make the determination that multiple agents can service the contact. For example, the system could automatically decide (e.g., by the number from which the call originated) that a particular customer is important enough to be serviced by multiple agents. On the other hand, the system might also determine that the customer is not eligible to even be presented with the option of being serviced by multiple agents. If the customer is presented with the option and decides not to allow multiple agents to service the contact, then the contact is routed to an agent (depicted in FIG. 2 as a "gold agent") having all the required skill sets of that contact, step 706. The queue for such a "gold agent" may be long and thus, the corresponding wait time for the customer may be very lengthy as well. When the "gold agent" conference/session is completed, the contact session is terminated, step 708

However, if the customer decides to allow multiple agents to service the contact, the contact may be routed to the first agent having at least one of the required skill sets, step 710. While the first agent may initiate a contact session with the customer, another (second) agent having another of the required skill sets for that contact may be identified, step 712. The customer may be presented with the option of conferencing in another agent, step 714. In the event that the customer does not wish to allow the second agent to join or conference into the contact session, then the contact may be given a higher or highest priority (step 716) for that particular skill set(s) such that once the session with the first agent is completed, the first available agent with the second skill set is placed into a contact session with the customer, step 718.

However, if the customer decides to allow the second agent to join the contact session with the first agent, then the second agent may be conferenced in, step 720. As noted above, both agents could be available from the outset, in which case steps 710 and 720 happen simultaneously. The process then may determine if all the required skill sets of that contact have been serviced, step 722, and if not, another agent (e.g., a third agent) having another of the required skill sets is identified, step 712. If all of the skill sets have been serviced and the conference/session has been completed, the contact session is terminated, step 708. If there are more skill sets to be serviced, once again, as an option based on system or designer preference, the customer may be presented with the option to conference in the third agent (step 714) or the approval of a first conference in will allow all additional agents to conference in automatically. Alternatively, a customer identifier may provide that all necessary agents are always automatically conferenced in during a contact session. Once the sessions associated with all of the skill sets for that contact are completed, the contact session is terminated.

In another embodiment, the order in which the multiple skill sets of the contact are serviced may be important. For example, prior to having an agent with a "sale" skill set communicate with the customer, another agent with a "new customer" skill set may be required to communication with the customer first. In this example, the customer will not be placed in communication with the agent with a "sale" skill set until the customer has been placed in communication with the agent with a "new customer" skill set. However, it may be desirable that the customer be placed in communication with the agent with a "sale" skill set as quickly as possible once the prerequisite skill set has been serviced. Accordingly, the priority identifier of the customer contact may be raised to ensure that the customer is always at the top of the queue for that skill set, which requires the prerequisite skill set. Consequently, the queuing algorithm may have priority directed by the skill set identifiers.

Figure 3:
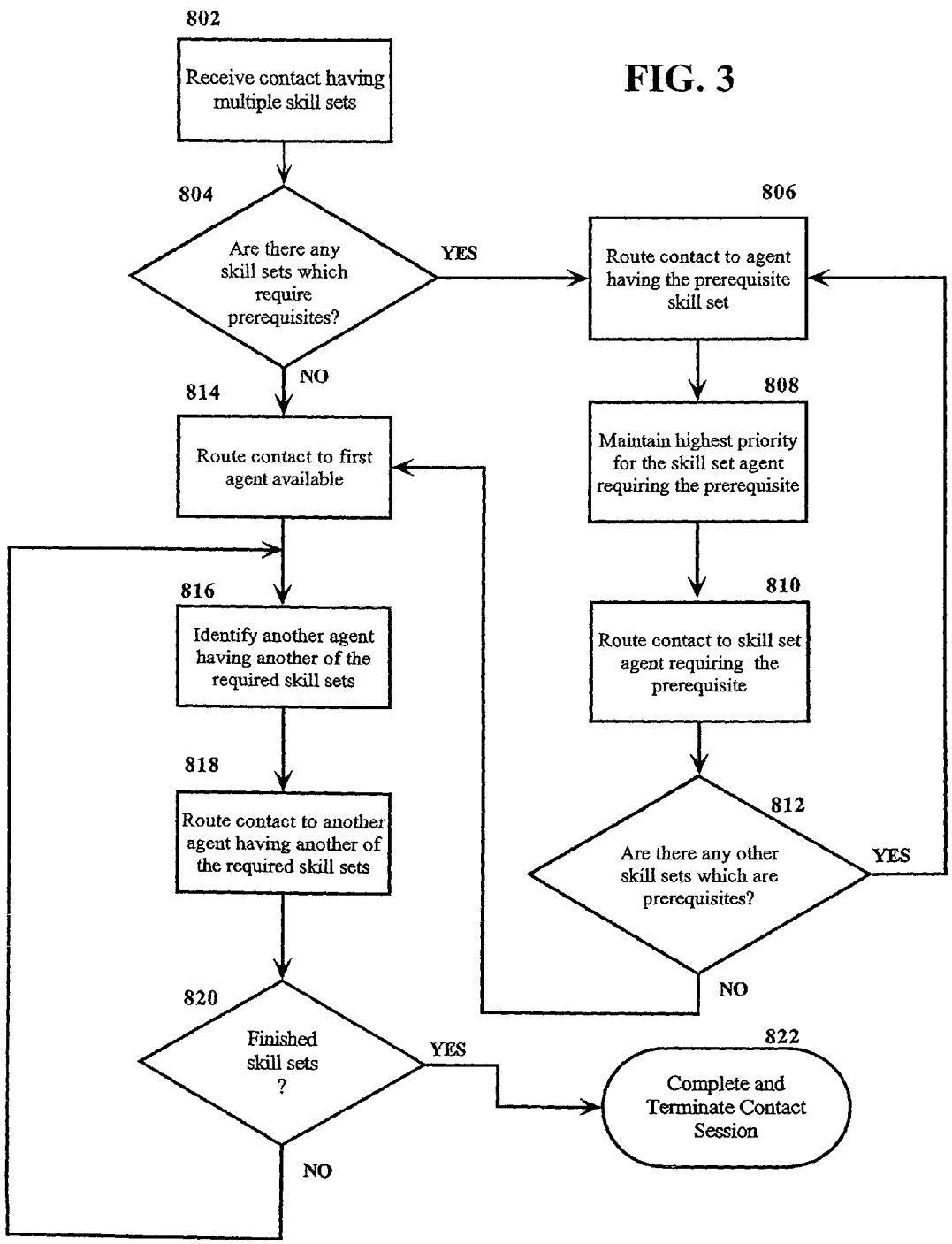
FIG. 3 is a flowchart of another embodiment of the process of managing a contact with multiple skill sets.

One embodiment of such a queuing algorithm is described with referenced to the flowchart of FIG. 3. Similar to the step 702, a contact center receives a contact object having multiple skill sets, step 802. The multiple skill sets are processed to determine if any of the skill sets require a prerequisite or precondition, step 804. If one of the skill sets has a prerequisite, the contact is routed to an agent having that prerequisite skill set, step 806. In some situations, an agent having the skill set that requires the prerequisite may be available before an agent having the prerequisite is available. In such a situation, it may be desirable to have the contact remain at or jump to the top of the queue (step 808) so that the customer's contact will be connected immediately upon the completion of the prerequisite, step 810. Upon completion of the contact session with the agent having the skill set requiring the prerequisite, a determination is made as to whether there are any other skill sets, which require a prerequisite, step 812, and if so, the contact is routed to an agent having the prerequisite skill set, step 806. Sometimes, when there are more than one skill set that requires a prerequisite, a decision on which of these skill sets should be connected or processed first will be necessary. For such situations, the contact manager or multimedia queue manager may maintain a priority ranking of the various skill sets. Otherwise, the contact, typically, can be routed to the first available agent having one of the skill sets of the contact object, step 814. Step 816 provides for identifying another agent having another one of the skill sets of the contact object, and routing the contact to that agent having another one of the skill sets of the contact object, step 818. Next a determination is made as to whether all the skill sets of the contact object have been serviced, step 820. If all the skill sets of the contact object have been serviced and the customer session has been completed, the contact session is terminated, step 822. On the other hand, if all the skill sets of the contact object have not been serviced, then an agent having another of the required skill sets may be identified (step 816) and the contact may be routed to such agent for service, step 818.

Although not shown in either FIG. 2 or FIG. 3, the method of processing or servicing a contact object having one or more skill sets that require prerequisites could be provided with the method of processing and conferencing of multiple agents to a single customer as shown in FIG. 2 and discussed above. These methods or processes may be used in a variety of combinations such as in parallel to each other or in a serial fashion.

In addition, certain high profile customers (sometimes referred to as "gold" customers) who have subscribed to a premium service would have their priority increased so that each time they communicate with a contact center, their contact is quickly placed to the head of the queue regardless of how many contacts are waiting in that specific queue. Such a priority identifier would thereby minimize the amount of wait time that customer subscriber would have to endure.

Another feature of the queue management system allows multiple customer contacts to be considered a single entity and queued to one or more agents (as described above) for a group contact session. The contacts may be of the same or different media-types. This represents an M to 1 or M to N service scheme where multiple customers having a common identifier, such as a shared key or the like, are queued based on the common identifier rather than the contact identifier in order to create a group contact session. The common identifier may be received via various mechanisms or protocols such as speech recognition, user-id association or any other suitable means. This service scheme provides for associating multiple contacts together such that all the customers are queued to the same agent (or agents) at the same time. For example, multiple students (customers) wish to gain access to a lecture given by a particular lecturer (agent). In an on-line tutorial environment, each of the students (customers) could contact the contact center via the Internet and be placed into a queue related to that particular lecturer (agent) provided they had the corresponding shared key (e.g. the identifier for the particular lecture). Once the lecturer is ready to commence the lecture all members of that queue would be placed in a contact session.

Another example of this M to 1 service scheme is where urgent technical support is required and there are multiple people involved in the problem. It would be advantageous to have all the parties necessary to resolve the problem call in, be routed to the queue of an agent, and connected with the agent (or agents) as a group to that particular agent. This service scheme solves the problem of one person calling technical support and then conferencing in other participants.

Figure 4:
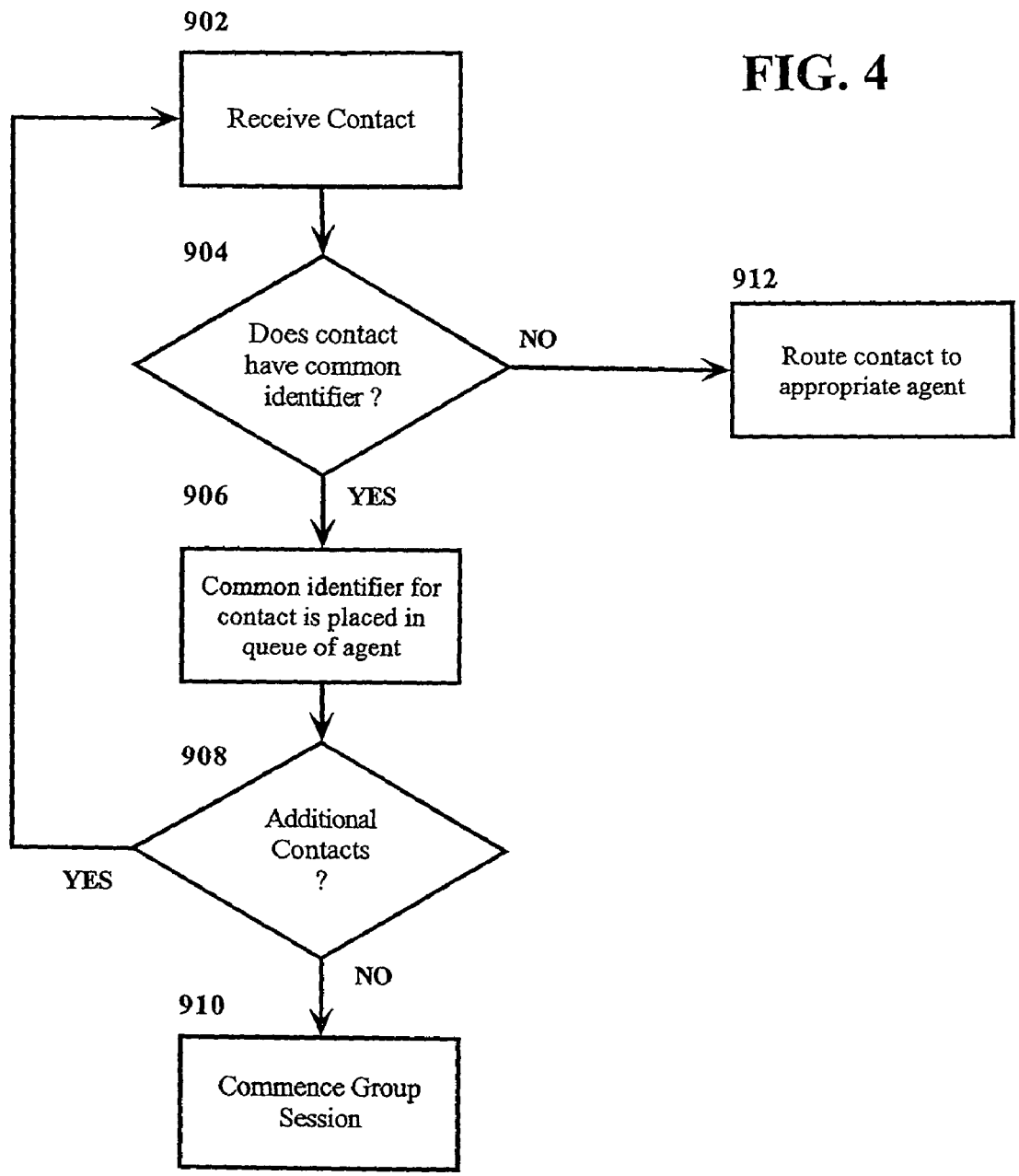
FIG. 4 is a flowchart of another embodiment of a process of managing a contact having a common identifier associated with a group of contacts.

As another example, the M to 1 service scheme can be applied to online gambling. For example, a person may be an expert poker player (agent) and offer up a challenge to others (multiple customers) to take him on in an online game of poker One embodiment of such a queuing method is described with referenced to the flowchart of FIG. 4. A contact center receives a contact, step 902, and checks to see whether that contact has a common identifier, such as a shared key, or other indicia that establishes that the contact is part of a larger group, step 904. If the contact has a common identifier that establishes that the contact is part of a larger group, the common identifier associated with the contact is placed in the queue, step 906. In this case, the common identifier rather the contact identifier is queued to the agent. The association between the contact and common identifier is used to establish the conference session with the agent when the common identifier reaches the top of the queue. Otherwise, the contact is considered a single contact and routed to the appropriate agent for handling, step 916. A determination is made if there are additional contacts which are part of the group that are waiting to be serviced, step 908. If so, then the additional contact is processed to determine whether the additional contact has the common identifier such as a shared key, step 904, and if the additional contact does have the shared key, there is no requirement to queue the common identifier since it is already present in the queue. This process continues until there are no additional contacts to process or it is time to commence the contact session. Once an agent is available, all the contacts associated with the common identifier are connected to agent, step 910.

In an alternative embodiment, additional contacts may be allowed to join the group contact session after it has already commenced. This would provide for other potential or required participants who were delayed in contacting the contact center.

As indicated in the above examples, contact centers receive contacts in many forms, including but not limited to, instant messages, telephone calls, chat session requests, emails, video calls, facsimile, short messaging service (SMS) messages and any other such communication between a remote user and an agent; and as such, the queuing process is in no way limited to telephony communications. Additionally, the method is not limited to inbound contact centers and may be used with equal applicability for outbound purposes, e.g. whereby agents are conferenced into an outbound session initiated to a customer.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

We claim:

1. A method of managing contacts within a contact center, the method comprising:
   receiving a contact;
   assigning a plurality of skill set identifiers to the contact;
   determining if the contact can be serviced by multiple agents;
   routing the contact to a first agent of the multiple agents having at least one of the plurality of skill set identifiers and commencing a contact session;
   identifying another agent of the multiple agents having another of the plurality of skill set identifiers; and
   determining if the another agent of the multiple agents should be conferenced into the contact session.

2. The method of claim 1, further comprising conferencing in the another of the multiple agents if it is determined that the another agent of the multiple agents should be conferenced into the contact session.

3. The method of claim 2, further comprising determining if yet another agent of the multiple agents should be conferenced into the contact session.

4. The method of claim 1, wherein assigning a plurality of skill set identifiers to the contact includes determining if the contact has any skill set identifier which requires a prerequisite.

5. The method of claim 4, wherein determining if the contact has any skill set identifier which requires a prerequisite includes routing the contact to an agent having the prerequisite.

6. The method of claim 1, wherein the assigning a plurality of skill set identifiers to the contact includes:
   creating a software object for the contact;
   analyzing the object to determine a queuing position for the object relative to at least one other object representing a contact having a similar skill set identifier; and
   adding to the object a reference to the at least one other object.

7. The method of claim 1, wherein determining if the contact can be serviced by multiple agents and determining if the another agent of the multiple agents should be conferenced into the contact session are established by a computing system supporting the contact center.

8. A system of managing contacts within a contact center, the system comprising:
   a network interface for receiving a contact; and
   a contact manager, the contact manager:
      assigning a plurality of skill set identifiers to the contact;
      determining if the contact can be serviced by multiple agents;
      routing the contact to a first agent of the multiple agents having at least one of the plurality of skill set identifiers to commence a contact session;
      identifying another agent of the multiple agents having another of the plurality of skill set identifiers; and
      determining if the another agent of the multiple agents should be conferenced into the contact session.

9. The system of managing contacts of claim 8, wherein the contact manager further conferences in the another of the multiple agents if it is determined that the another agent of the multiple agents should be conferenced into the contact session . . . .

10. The system of managing contacts of claim 9, wherein the contact manager further determines if yet another agent of the multiple agents should be conferenced into the contact session.

11. The system of managing contacts of claim 8, wherein assigning a plurality of skill set identifiers to the contact includes determining if the contact has any skill set identifier that requires a prerequisite.

12. The system of managing contacts of claim 11, wherein determining if the contact has any skill set identifier which requires a prerequisite includes routing the contact to an agent having the prerequisite.

13. The system of managing contacts of claim 8, wherein the assigning a plurality of skill set identifiers to the contact includes:
   creating a software object for the contact;
   analyzing the object to determine a queuing position for the object relative to at least one other object representing a contact having a similar skill set identifier; and,
   adding to the object a reference to the at least one other object.

14. The system of managing contacts of claim 8, wherein the contact is at least one of a telephony communication, an email, a facsimile transmission, a video communication, a short messaging service and a chat session communication.

15. A storage medium storing a computer program which when executed by a processing unit performs a method for managing contacts within a contact center, the method comprising:
   receiving a contact;
   assigning a plurality of skill set identifiers to the contact;
   determining if the contact can be serviced by multiple agents;
   routing the contact to a first of the multiple agents having at least one of the plurality of skill set identifiers and commencing a contact session;
   identifying another of the multiple agents having another of the plurality of skill set identifiers; and
   determining if the another of the multiple agents should be conferenced into the contact session.

16. The storage medium of claim 15, wherein the method further comprises conferencing in the another of the multiple agents if it is determined that the another agent of the multiple agents should be conferenced into the contact session.

17. The storage medium of claim 15, wherein the method further comprises determining if yet another agent of the multiple agents should be conferenced into the contact session.

18. The storage medium of claim 17, wherein conferencing in the another of the multiple agents includes determining if yet another agent of the multiple agents should be conferenced into the contact session.

19. The storage medium of claim 15, wherein assigning a plurality of skill set identifiers to the contact includes determining if the contact has any skill set identifier which requires a prerequisite.

20. The storage medium of claim 19, wherein determining if the contact has any skill set identifier which requires a prerequisite includes routing the contact to an agent having the prerequisite.

21. The storage medium of claim 15, wherein the assigning a plurality of skill set identifiers to the contact includes:
   creating a software object for the contact;
   analyzing the object to determine a queuing position for the object relative to at least one other object representing a contact having a similar skill set identifier; and,
   adding to the object a reference to the at least one other object.

22. The storage medium of claim 15, wherein determining if the contact can be serviced by multiple agents and determining if the another agent of the multiple agents should be conferenced into the contact session are established by a computing system supporting the contact center.

23. A method of managing contacts, the method comprising:
   receiving a contact;
   determining if the contact has a common identifier associating the contact with a larger group;
   routing the contact associated with the common identifier to an agent;
   identifying additional contacts having the common identifier;
   routing the additional contacts having the common identifier to the agent; and
   commencing a group contact session.

24. The method of claim 23, further comprising queuing the common identifier to a skill set.

25. The method of claim 23, further comprising:
   assigning a plurality of skill set identifiers to the common identifier;
   determining if the common identifier can be serviced by multiple agents;
   routing the contact associated with the common identifier to a first agent of the multiple agents having at least one of the plurality of skill set identifiers and commencing a contact session;
   identifying another agent of the multiple agents having another of the plurality of skill set identifiers; and
   determining if the another agent of the multiple agents should be conferenced into the contact session.

* * * * *